United States Patent
Ansorge et al.

(10) Patent No.: US 7,711,338 B2
(45) Date of Patent: May 4, 2010

(54) FREQUENCY OFFSET CORRECTION BASED ON THE PRESENCE OR ABSENCE OF A RECEIVED SIGNAL

(75) Inventors: Christian Ansorge, Ulm (DE); Michael Reiner, Ulm (DE)

(73) Assignee: Nokia Corporation, Espoo (FI)

( * ) Notice: Subject to any disclaimer, the term of this patent is extended or adjusted under 35 U.S.C. 154(b) by 370 days.

(21) Appl. No.: 10/497,117

(22) PCT Filed: Dec. 5, 2001

(86) PCT No.: PCT/EP01/14285

§ 371 (c)(1),
(2), (4) Date: Nov. 22, 2004

(87) PCT Pub. No.: WO03/049391

PCT Pub. Date: Jun. 12, 2003

(65) Prior Publication Data

US 2005/0079845 A1    Apr. 14, 2005

(51) Int. Cl.
H04B 1/06    (2006.01)
H04B 7/00    (2006.01)

(52) U.S. Cl. .................. 455/255; 455/151.3; 455/182.1

(58) Field of Classification Search ................ 455/255, 455/151.3, 154.1, 161.2, 164.1, 164.2, 165.1, 455/182.1, 182.2, 183.1, 183.2, 192.1, 192.2, 455/256

See application file for complete search history.

(56) References Cited

U.S. PATENT DOCUMENTS

| 4,651,104 A | 3/1987 | Miyo ........................ 328/139 |
| 4,947,409 A | 8/1990 | Raith et al. .................... 375/97 |
| 5,128,968 A | 7/1992 | Yoshida ........................ 375/97 |
| 5,629,708 A * | 5/1997 | Rodal et al. ............. 342/357.15 |
| 5,719,782 A * | 2/1998 | Mitsuoka ...................... 702/75 |
| 5,790,604 A | 8/1998 | Kelton et al. ................. 375/344 |
| 5,847,613 A * | 12/1998 | Langlet et al. .................. 331/3 |
| 6,148,187 A * | 11/2000 | Chiba ....................... 455/192.2 |
| 6,522,871 B1* | 2/2003 | Patrick et al. ................ 455/256 |
| 2001/0053192 A1* | 12/2001 | Matsu Moto et al. ......... 375/344 |

FOREIGN PATENT DOCUMENTS

EP    1 111 830    6/2001
WO    WO 01/86316    11/2001

* cited by examiner

*Primary Examiner*—Nay A Maung
*Assistant Examiner*—Tuan H Nguyen

(57) ABSTRACT

The present invention relates to a method for controlling a frequency in a receiver, in particular in a receiver used in a telecommunications system. To keep precise clock frequency even when the synchronization signal from base-station is missing the method comprises the steps of: determining a change of an internal reference oscillator frequency relative to the frequency of the received signal from a transmitting station, determining a frequency control value for controlling the internal reference oscillator frequency, storing at least one value indicating the change of the internal reference oscillator frequency, and controlling the internal reference oscillator frequency in accordance with the frequency control value, that has been determined either in accordance with the change of the internal reference oscillator frequency relative to the frequency of the received signal in case that the signal from the transmitting station has been received (S20), or in accordance with the stored value(s) indicating the change of the internal reference oscillator frequency in case that the received signal has been missed (S30).

12 Claims, 2 Drawing Sheets

FREQUENCY OFFSET CORRECTION BASED ON THE PRESENCE OR ABSENCE OF A RECEIVED SIGNAL

FIELD OF THE INVENTION

The present invention relates to a method for controlling a frequency in a receiver, in particular in a receiver used in a telecommunications system.

BACKGROUND OF THE INVENTION

Conventional mobile phone apparatuses often use a temperature compensated quartz crystal oscillator (VCTCXO) to control the master clock frequency needed for demodulating the received signal, according to base-station synchronization signal. However, such a temperature compensated quartz crystal oscillator is expensive, big in size and can not be made on an integrated semiconductor IC.

According to another implementation, a mobile phone apparatus uses an uncompensated quartz crystal oscillator that is frequency controlled depending on the carrier frequency used by a base station and derived from the received signal. In this case there are problems to keep precise clock frequency accuracy when base station synchronization gets lost, i.e. during a temporary reception gap period. Such reception gaps occur whenever a mobile phone user leaves the coverage area of a base station so that connection between the mobile phone and the base station is lost suddenly, e.g. when the user is moving through a tunnel etc.

A receiver known from U.S. Pat. No. 4,947,409, e.g. a receiver of a mobile telephone comprises a high-frequency stage and an intermediate-frequency stage for mixing down a signal received by an antenna to obtain two quadrature signals, i.e. an inphase signal and a quadrature phase signal. The mixing frequencies are supplied to the high-frequency and an intermediate-frequency stages from a local oscillator. This oscillator is controlled by a control processor in accordance with a frequency error signal derived from the two quadrature signals so that it operates in synchronism with the transmitting station.

Such a prior art mobile phone apparatus is suffering from poor accuracy. When such mobile phone loses synchronous operation to the base station it can not immediately get the link back when coverage reappears again, i.e. when the mobile phone user enters the coverage area of a base station again. Instead it takes some unacceptable long time to become synchronized again and to continue mobile link services.

In U.S. Pat. No. 5,790,604 a method and an apparatus for automatic frequency correction acquisition is described that is used in a subscriber receiver of a wired TV and telephone system. This apparatus comprises an automatic frequency correction loop that can be operated in two different modes, i.e. in an acquisition mode and in a tracking mode. The former provides an estimate of the frequency offset relatively rapidly, but in the latter mode the automatic frequency correction loop follows changes in the frequency offset more accurately.

In operation, when the receiver first attempts to acquire a new modulated carrier, either upon power up or upon a change of the carriers at the transmitter, the automatic frequency correction loop is switch into the acquisition mode. When the frequency offset obtained by this mode becomes more accurate, the automatic frequency correction loop is switched into the tracking mode to further increase the accuracy of the frequency offset estimate. However, U.S. Pat. No. 5,790,604 is silent about determining the frequency offset in case of a temporary reception gap.

SUMMARY OF THE INVENTION

The object underlying the present invention is to provide a method for correcting a frequency in a receiver that keeps precise clock frequency even when the synchronization signal from base-station is missing.

To achieve this object a method for controlling a frequency in a receiver, in particular in a receiver used in a telecommunications system, comprises the steps of: determining a change of an internal reference oscillator frequency relative to the frequency of the received signal from a transmitting station, determining a frequency control value for controlling the internal reference oscillator frequency, storing at least one value indicating the change of the internal reference oscillator frequency, and controlling the internal reference oscillator frequency in accordance with the frequency control value, that has been determined either in accordance with the change of the internal reference oscillator frequency relative to the frequency of the received signal in case that the signal from the transmitting station has been received, or in accordance with the stored value(s) indicating the change of the internal reference oscillator frequency in case that the received signal has been missed.

Thus, the present invention combines the precision of the temperature-controlled oscillator with the simplicity and easiness of the uncompensated one. Especially, to achieve a high degree of frequency stability, the receiver is permanently measuring the frequency of the received signal relative to the internal oscillator frequency and is calculating and storing one or more values indicating the change of the oscillator frequency. When synchronization loss is detected, i.e. the received signal from the transmitter station, e.g. a base station of a radio communications network, is missing, the stored information is taken to calculate the expected frequency change. Therefore, a prediction to the future can be made. The predicted frequency change will be taken to calculate a control voltage for the internal oscillator during a first period of missing synchronization, i.e. of missing the received signal.

Preferably, the frequency control value is determined on the basis of the stored values by extrapolation.

It is the nature of a real physical system that the frequency change over time and therefore the control voltage drift over time at the moment just before synchronisation is lost will have the same slope as the slope of the frequency change just after this time point. However, after a longer period of time without synchronisation the presumption of a constant slope can no longer be assumed, because the oscillator frequency will not change forever only into one direction. Consequently, according to a preferred refinement of the present invention the control value is kept constant after a first period of missing the received signal has been elapsed during which the control value has been determined by extrapolation.

According to an advantageous development of the present invention the slope of the change of the internal reference oscillator frequency is calculated and stored for determining the frequency control value in case that the received signal has been missed.

According to another preferred refinement of the present invention the frequency control values determined in accordance with the change of the internal reference oscillator frequency relative to the frequency of the received signal, in particular a predetermined number of frequency control sample values over the last period of time are stored for determining the frequency control value in case that the received signal has been missed.

These sample values that represents a control voltage for the internal reference oscillator frequency, are taken to calculate the slope of the control voltage over time when the received signal is missing.

Storage of sample values and calculation of new predicted values for controlling the frequency of an internal oscillator, e.g. a quartz crystal oscillator, simply can be handled by the same processing unit that also deals with the other control and signal handling functions a receiver of a mobile phone needs for normal operation. Therefore, the method according to the present invention can be implemented by a few changes of software code to enable calculating the compensation scheme described above.

BRIEF DESCRIPTION OF THE DRAWINGS

The present invention will be explained in more detail hereinafter with reference to accompanying drawings showing preferred embodiments.

DETAILED DESCRIPTION OF THE PREFERRED EMBODIMENTS

Figure 1:
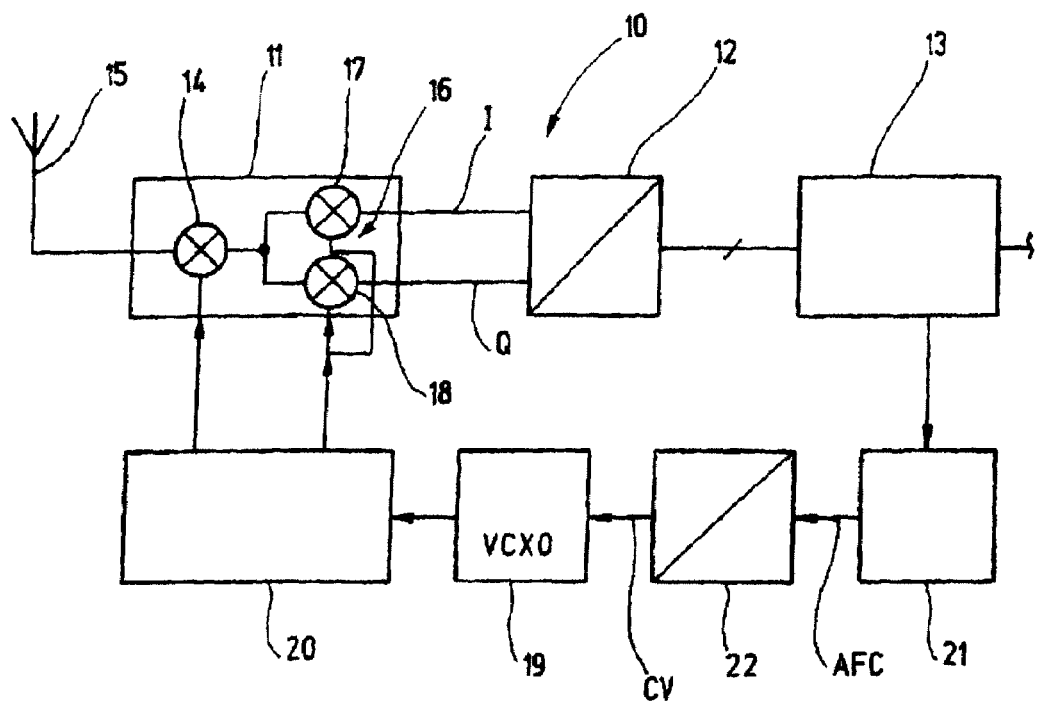
FIG. 1 shows a simplified schematic block diagram of a receiver used with the present invention.
Figure 2:
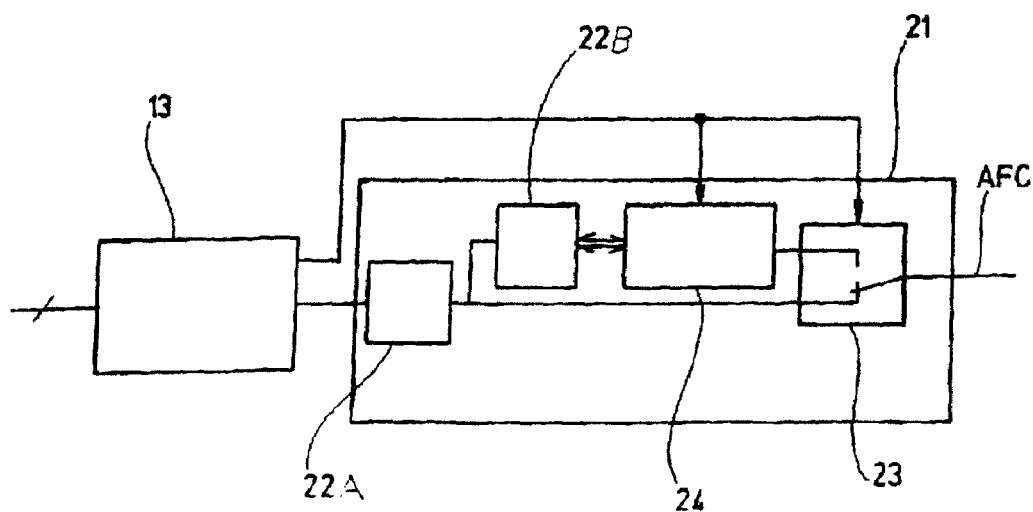
FIG. 2 shows a simplified schematic block diagram of a calculating and processing unit that can be used with a receiver for controlling an internal reference oscillator frequency.

As shown in FIG. 1, a receiver, in particular a receiver used in a telecommunications system like the receiver of a mobile telephone that can be used with the inventive method comprises a demodulating circuit 10 having an input put circuit 11, an analog/digital-converter 12 and a calculating unit 13. The calculating unit 13 can be an individual circuit but can also be a part of a general processing unit that deals with control and signal handling functions a receiver and/or a mobile phone needs for normal operation.

The input circuit 11 comprises a high frequency stage 14 for mixing down a signal received by an antenna 15 and an intermediate frequency stage 16 having a first and a second mixer 17, 18 for mixing down an intermediate frequency signal and outputting two quadrature signals, an inphase signal I and a quadrature phase signal Q. These signals I, Q are output by the input circuit 11 to the analog/digital converter 12 that supplies digital signals corresponding to the output signals of the input circuit 11 to the calculating unit 13.

The calculating unit 13 that supplies an output signal to further processing circuits (not shown) derives frequency information from the received signal and generates a frequency error signal that is indicative for the difference between the actual internal reference oscillator frequency, i.e. the actual master clock frequency generated by an internal reference oscillator 19, e.g. a voltage controlled quartz crystal oscillator VCXO that supplies master clock signal to a synthesizer circuit 20. The synthesizer 20 derives a high-frequency and an intermediate-frequency signal that is delivered to the high-frequency stage 14 and the mixers 17, 18 of the intermediate-frequency stage for respectively mixing down the received signal to obtain the two quadrature signals for further processing.

The frequency error signal obtained by the calculating unit 13 is processed by a control processing unit 21 to obtain frequency correction information and calculates an automatic frequency control value AFC that corresponds to a control voltage CV for controlling the internal reference oscillator 19. The AFC value is supplied to a digital/analog converter 22 that generates the respective control voltage for the internal reference oscillator 19 in accordance with the received AFC value.

As long as the telecommunications link between the transmitting or base-station and the receiver is operating well due to good link conditions, the master clock frequency of the internal reference oscillator 19 is controlled by the control voltage VC derived from frequency correction information that is obtained from the received path measurements performed in the demodulating circuit 10.

During the normal operation, i.e. as long as the communication link to the base station is working in a sufficient manner a value indicating the change of the internal reference oscillator frequency is stored so as to monitor the changes of the internal reference oscillator frequency over time. For example, it is possible to store a value of the frequency error signal for a plurality of short successive time periods so that a drift or change of the internal reference oscillator frequency can be determined.

In case that the frequency error signal represents frequency differences between the frequencies of the mixing signals and the carrier frequency and/or the intermediate frequency, the frequency error signal indicates substantially the slope of the oscillator frequency drift. Thus, it is possible to predict future values of the internal reference oscillator frequency drift from such a frequency error signal by extrapolation. Another possibility is to calculate the slope of the change or drift of the internal reference oscillator frequency from the frequency error signal for predicting an oscillator control voltage in case that synchronization with the base station gets lost due to missing the received signal.

According to a preferred embodiment of the present invention the control processing unit 21 comprises first processing means 22A for determining an automatic frequency control value AFC on the basis of the frequency error signal received from the calculating unit 13. The AFC value is directly supplied to the output of the processing unit 21 via a switching means 23 that connects in a first position the output of the first processing means 22A to the output of the control processing unit 21. In addition, the AFC value of the first processing means is supplied to a buffer 22B that stores samples of the AFC value to monitor the history of the changes or drifts of the AFC value. In particular, a specific number of sample values are stored in the buffer 22B so that the change of the AFC value during a certain last period is documented by these values.

Furthermore, second processing means 24 are provided to calculate an AFC value on the basis of the stored AFC values in case that synchronization with the base station is lost. Although, the calculating unit 13 and the control processing unit 21 with its different buffer, processing and switching means have been described as separate circuit elements, all these elements or parts thereof can be also realized by a software program using a suitable microprocessor or the like.

Figure 3:
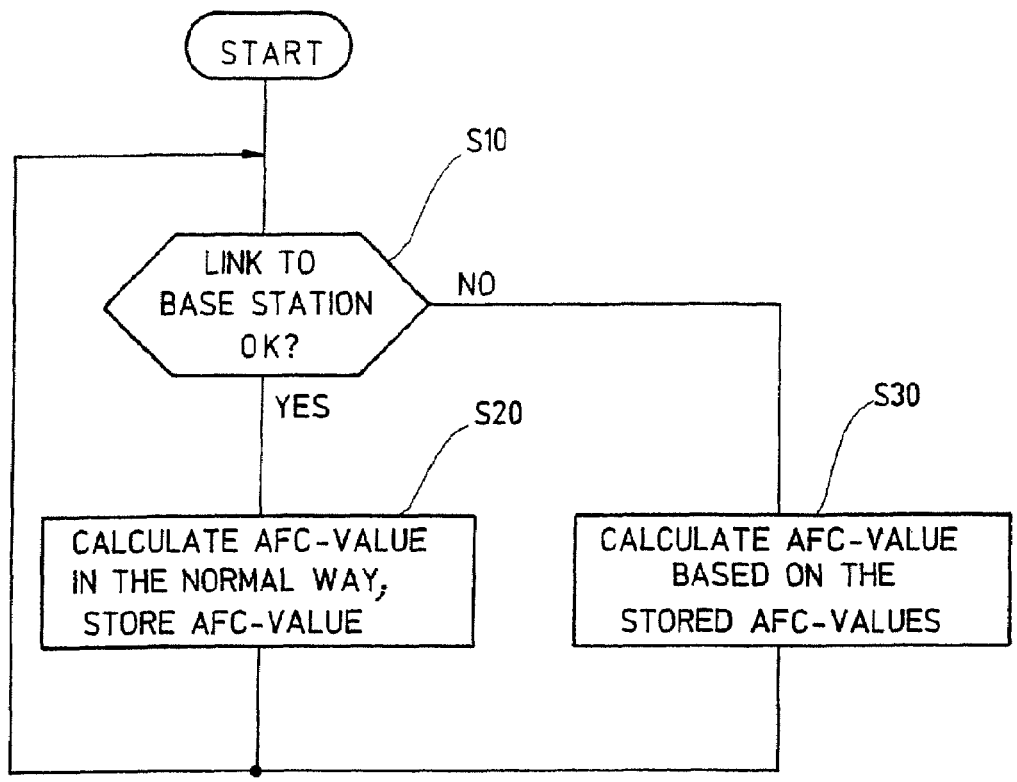
FIG. 3 a simplified schematic flow chart of the method according to the present invention.

The operation of the preferred embodiment will be explained hereinafter referring in addition to FIGS. 3 and 4.

After establishing a communications link between a transmitting station, e.g. a base-station of a telecommunications network, and a receiver, e.g. the receiver of a mobile phone, an automatic frequency control is started. As shown in FIG. 3 it is checked in step S10 whether or not the link between the mobile phone and the base-station is established and working well. If the link is working on a sufficient manner (OK) the AFC value that represents the control voltage for the internal referenced oscillator 19 is calculated in the normal way by the first processing means 22 and supplied to the digital analog converter 22 via switching means 23. In addition, the calculated AFC value is stored in the buffer 22B. Thereafter the quality of the link is checked again in step 10.

The inventive method is working in this loop as long as the link between the mobile phone and the base-station exists, i.e. as long as the user of the mobile phone has not left the coverage area of the base-station.

In case that it has been detected that the link is interrupted in step S10 the AFC value is calculated by the second processing means 24 on the basis of the AFC values stored in the buffer 22B. In this case the signal indicating that the received signal is missing is supplied to the second calculating means 24 and to the switching means 23. Therefore, the second processing means 24 starts to calculate the AFC value on the basis of the stored AFC values while the switching means 23 is switched over into its second position so as to connect the output of the second processing means 24 to the digital/analog converter 22 for generating a respective control voltage for the internal reference oscillator 19. After outputting the AFC value predicted on the basis of the stored AFC values by extrapolation the link is checked again and the AFC value prediction according to step 30 is continued during a first period of time after the loss of synchronization as long as synchronization is not reestablished, i.e. the link is not built up again.

Figure 4:
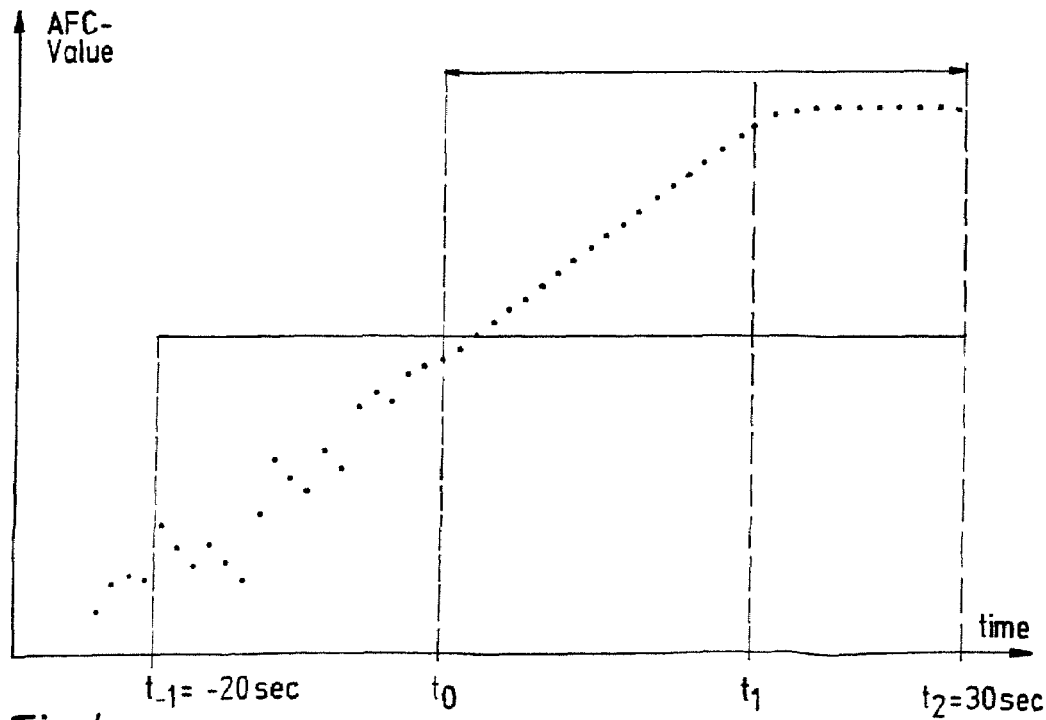
FIG. 4 a diagram illustrating the frequency control values before and after a synchronization loss at the time $t_0$.

If the link is interrupted for a time longer than the predetermined period, e.g. for a time longer than $t_1$ as indicated in FIG. 4 the prediction of the AFC value based on extrapolating is stopped and replaced by outputting a constant AFC value as indicated in the interval between $t_1$ and $t_2$. The reason is that the frequency of the oscillator will not change for a very long time only into one direction but will stop after a certain period and will be constant or change in the other direction.

Therefore, it is possible to predict the missing frequency correction information on the basis of the history of the change of the internal reference oscillator frequency so that after interruption of a communications link the communications link can be reestablished in a very short time since the synchronization of the receiver with the base-station has not been lost due to the prediction of the frequency correction information based on the history thereof.

The invention claimed is:

1. A method comprising:
   determining a change of an internal reference oscillator frequency relative to a frequency of a received signal, which signal would be received from a transmitting station upon use of a receiver with the telecommunications system,
   determining a frequency control value for controlling the internal reference oscillator frequency,
   storing plural values indicating the change of the internal reference oscillator frequency so as to monitor the changes of the internal reference oscillator frequency over time to serve as a prediction of future change of the internal reference oscillator frequency, where the plural values indicate that the change of the internal reference oscillator frequency is a time dependent history of the change of the internal reference oscillator frequency for reestablishing a communication link in the telecommunications system, and the slope of the change of the internal reference oscillator frequency is calculated and stored for determining the frequency control value in case that the received signal has been missed, and
   controlling the internal reference oscillator frequency by the frequency control value in accordance with the oscillator frequency relative to the received signal frequency in the presence of the received signal, and in accordance with the stored change-of-frequency value in the absence of the received signal.

2. The method as claimed in claim 1, wherein the frequency control value is determined on the basis of the stored values by extrapolation.

3. The method as claimed in claim 2, wherein the control value is determined by extrapolation during a first period of missing the received signal and is kept constant after the first period has been elapsed.

4. The method as claimed in claim 1, wherein the frequency control values determined in accordance with the change of the internal reference oscillator frequency relative to the frequency of the received signal are stored for determining the frequency control value in case that the received signal has been missed.

5. The method as claimed in claim 4, wherein a predetermined number of frequency control sample values over the last period of time are stored.

6. The method as claimed in claim 5, wherein these sample values that represents a control voltage for the internal reference oscillator frequency, are taken to calculate the slope of the control voltage over time when the received signal is missing.

7. An apparatus comprising:
   circuitry for determining a change of an internal reference oscillator frequency relative to a frequency of a received signal, which signal would be received from a transmitting station upon use of the apparatus in a telecommunications system,
   a controller for determining a frequency control value for controlling the internal reference oscillator frequency,
   a memory for storing plural values indicating the change of the internal reference oscillator frequency so as to monitor the changes of the internal reference oscillator frequency over time to serve as a prediction of future change of the internal reference oscillator frequency, where the plural values indicate that the change of the internal reference oscillator frequency is a time dependent history of the change of the internal reference oscillator frequency for reestablishing a communication link in the telecommunications system, and the slope of the change of the internal reference oscillator frequency is calculated and stored for determining the frequency control value in case that the received signal has been missed, and
   circuitry for controlling the internal reference oscillator frequency by the frequency control value in accordance with the oscillator frequency relative to the received signal frequency in the presence of the received signal, and in accordance with the stored change-of-frequency value in the absence of the received signal.

8. The apparatus as claimed in claim 7, wherein the frequency control value is determined on the basis of the stored values by extrapolation.

9. The apparatus as claimed in claim 8, wherein the control value is determined by extrapolation during a first period of missing the received signal and is kept constant after the first period has been elapsed.

10. The apparatus as claimed in claim 7, wherein the frequency control values determined in accordance with the change of the internal reference oscillator frequency relative to the frequency of the received signal are stored for determining the frequency control value in case that the received signal has been missed.

11. The apparatus as claimed in claim 10, wherein a predetermined number of frequency control sample values over the last period of time are stored.

12. The apparatus as claimed in claim 11, wherein these sample values, that represent a control voltage for the internal reference oscillator frequency, are taken to calculate the slope of the control voltage over time when the received signal is missing.

* * * * *